United States Patent [19]

Luxemburg

[11] 4,289,631
[45] Sep. 15, 1981

[54] COMPOSITIONS AND PROCESS FOR EXTENSION OF THE USEFUL LIFE OF MACHINE ELEMENTS

[76] Inventor: S. Roy Luxemburg, 680 Sharp La., Baton Rouge, La. 70815

[21] Appl. No.: 861,126

[22] Filed: Dec. 16, 1977

Related U.S. Application Data

[63] Continuation-in-part of Ser. No. 772,547, Feb. 28, 1977, abandoned.

[51] Int. Cl.$^3$ .................................... C09K 7/00
[52] U.S. Cl. ........................ 252/8.5 B; 252/8.5 A; 252/8.5 C; 175/57; 175/371; 106/1.23
[58] Field of Search ............ 252/8.5 B, 8.5 A, 8.5 C, 252/12, 19, 14, 25, 26; 106/1.23, 1.12, 1.16, 1.17, 309; 175/57, 371, 64; 166/244 C

[56] References Cited

U.S. PATENT DOCUMENTS

| | | | |
|---|---|---|---|
| 2,605,221 | 7/1952 | Hoeppel | 252/8.5 A |
| 2,754,266 | 7/1956 | Stegemier et al. | 252/19 |
| 3,232,872 | 2/1966 | Kohn | 252/19 |
| 3,619,842 | 11/1971 | Maurson | 252/10 |
| 3,652,414 | 3/1972 | Bergeron | 252/19 |
| 3,676,363 | 7/1972 | Mosier | 252/8.5 B |
| 3,928,211 | 12/1975 | Browning et al. | 252/8.5 B |

*Primary Examiner*—Benjamin R. Padgett
*Assistant Examiner*—J. L. Barr
*Attorney, Agent, or Firm*—Llewellyn A. Proctor

[57] ABSTRACT

Compositions, and the process of their use, for extending the useful life of machine elements wherein two metal bearing surfaces are in contact one with the other, or with a working surface, e.g., drill bits, gear faces, bearings, sleeves, bushings, ball-joints, journalled shafts, and the like. The compositions are formed by use of a carrier, e.g., as an oil, grease, synthetic, or the like, by the addition thereto of reactants comprised of an electron donor metal, or compound, and a decomposable plating-metal bearing compound, one or both of which reactants is encapsulated or coated to separate the reactants. In the process embodiment which embodies use of the composition at preselected conditions which characterize those exhibited at the metal bearing surfaces of the machine elements during an operating function, the encapsulating material is broken down, this causing release, and contact, of the reactants to produce a chemical reaction wherein the plating-metal portion of the decomposable plating-metal bearing compounds is electrodeposited, or electroplated, upon the metallic bearing surfaces of the machine element, this extending its wear capabilities, and useful life. A particularly preferred process is one wherein the reactants are added to a drilling mud to form compositions used in drilling for oil or gas, which results in the release and chemical reaction of the reactants at the bottom of a well bore, this electroplating the plating-metal upon the drill bit to extend its useful life.

10 Claims, No Drawings

COMPOSITIONS AND PROCESS FOR EXTENSION OF THE USEFUL LIFE OF MACHINE ELEMENTS

RELATED APPLICATIONS

This is a continuation-in-part of application Ser. No. 772,547 filed Feb. 28, 1977, herewith incorporated by reference. This application is now abandoned.

Lubrication has constituted the principal, if not indeed a virtually universal, approach for extending the useful life of machine elements wherein two contacting surfaces are forced to slide one over another, or over a working surface, as in drill bits, gear faces, bearings, sleeves, bushings, ball-joints, journalled shafts and the like. Lubrication has as its principal object the reduction of friction, and secondarily the minimization of wear and suppression of corrosion. It is accomplished by inserting a thin film of lubricant, i.e., oil, grease or solid, between the sliding surfaces which substitutes a lower fluid friction for a higher, dry metal friction. Despite the wide variety and use of such lubricants, however, there remains a crying need for extending the life of machine elements which, for example, can be exemplified in the use of drill bits as widely employed in the exploration activities of the oil and gas industry.

The production of petroleum and gas requires drilling a hole into the earth, rotary drilling being the principal drilling method used today in the production of oil and gas. In a rotary drilling operation, the drill bit, or cutting element, is attached via a collar to the lower end of a drill pipe, or drill string, and the top of the drill pipe, or top of the uppermost pipe of the drill string is connected to a swivel and kelly which is suspended from a derrick, or drilling rig. The kelly is retained within a power driven turntable, or rotary, which rotates the drill string and bit. During drilling, the bit and drill string are cooled, and cuttings are removed from the bottom of the well by a circulating mud slurry which is pumped into the swivel, kelly and down the drill pipe and out through openings in the bit, the mud ascending and carrying the cuttings up the annular space outside the drill pipe to a settling pit at the surface. Various compositions are blended with the mud to lubricate the bit, weight the mud, maintain alkalinity and desired viscosity. Drilling requires progressively cutting depth increments of one joint of pipe, making connections by adding single joints of pipe to the drill string just below the kelly, and continuing in this manner until the drill bit becomes worn, or dull, this necessitating a bit change.

Changing the bit is accomplished by making a "trip," this comprising coming out of the hole, changing the bit, reassembling the drill string, and going back into the hole with the new bit. This means, in making a trip, that generally thousands of feet of pipe must be pulled out of the well bore and the joints of pipe (usually about thirty feet in length) separated as stands of two or three joints each and stacked on the floor of the drilling rig and, after the bit has been changed, the stands must thereafter be picked up by the swivel and kelly for reassembly and return to the hole. Drilling is continued when the bit is again in position at the bottom of the hole, and circulation of the mud has been restored.

In drilling an oil or gas well it is commonplace to change a bit many, many times before the well is completed. This means, of course, that considerable operating time is lost due to the necessity of withdrawing thousands of feet of pipe from a well bore, and returning same to the well bore after each bit has been replaced. For example, wells drilled in this country in the early sixties descended on the average to a depth of over 4400 feet. One well in Louisiana, during this period, produced oil at 21,413 feet. Today, it is commonplace to drill wells to this depth and beyond, particularly offshore, and it is increasingly apparent that wells must be drilled to even greater depths to produce the oil and gas necessary to satisfy the Nation's needs. Albeit considerable ingenuity has been exercised by the industry in the improvement of modern metal roller bits to increase their useful life in cutting through the various earth formations, many particularly hard abrasive formations, much yet needs to be done to lengthen their time of useful service. In fact, as suggested, there is a crying need for technology which will extend the useful life of machine elements generally, wherein two contacting surfaces of metal, generally constituted of a ferrous metal alloy, are forced to slide one over another, or over a working surface, or both.

It is, accordingly, the primary objective of the present invention to supply this need.

A particular object is to provide new and novel compositions, as well as a process useful for extending the life of machine elements, particularly metal drill bits as used for the production of oil and gas.

A specific object is to provide a novel lubricant composition which will increase the wear capabilities of metallic machine elements generally, as widely used by industry.

Another specific object is to provide a novel drilling mud which will increase the wear capabilities of metal drill bits as used in the oil and gas industry.

These objects and others are achieved in accordance with the present invention embodying a composition constituted of a carrier, and reactants comprised of an electron donor metal, or compound, preferably a metal powder, and a decomposable plating-metal bearing compound, preferably a salt, the donor metal, or compound, or the decomposable plating-metal bearing compound, or both, being encapsulated or coated to provide a physical barrier which maintains chemical separation, and suppresses reaction between said donor metal and said decomposable plating-metal bearing compound. The electromotive potential of said donor metal and plating-metal differ one from the other such that on dissolution, or decomposition, of the encapsulating material, or materials, as when the composition is contacted with the metallic surface of a machine element at conditions which will decompose the encapsulating material, the electron donor metal is released and contacted with said decomposable plating-metal bearing compound, or salt, to produce a chemical reaction wherein the plating-metal portion of the decomposable plating-metal bearing compound, or salt, is electrodeposited, or electroplated, upon the metallic surface constituting the machine element, the added metal-plating effecting an increase in the useful life of the machine element.

The carrier, in one of its preferred aspects, is comprised of a lubricant within which is admixed the electron donor metal or decomposable plating-metal bearing compound, or salt, the donor metal or decomposable plating-metal bearing compound, or both, being encapsulated or coated with a material, or materials, which maintains the two different reactants chemically separated one from another prior to release of the reactants in an electroplating operation. Such lubricant is constituted generally of conventional oils and greases, natural or synthetic, such as petroleum or mineral oils, fixed oils, and greases to which various additives, e.g., soaps, surface active agents and detergents, can be added, if desired. Such compositions are particularly useful in that they retain the natural lubricating action of the oil or grease which reduces wear as well as friction when applied to machine elements without interfering with the electroplating function. Under the heat and pressure produced by the metallic load bearing surfaces of the machine elements with which such composition is brought into contact, the encapsulating material is physically or chemically decomposed and broken down to permit contact of the donor metal and decomposable plating-metal bearing compound, the reaction causing electrodeposition of the plating-metal of the decomposable plating-metal bearing compound onto the metallic surfaces of said machine element.

A preferred composition can thus be formed by blending together a conventional petroleum, mineral oil, grease or synthetic lubricant, or a component or additive thereof which contains various soaps or detergents to which is added a particular electron donor metal, or compound, preferably zinc, and a particulate decomposable plating-metal compound, preferably a salt of copper such as cupric sulfate, but preferably both, is encapsulated or coated with a thin film of polyethylene because of its friction reducing characteristics. Suitably, the coated particles range in average diameter from about 5 microns to about 150 microns. Mineral oils and synthetic lubricants, e.g., polyalkylene glycols, silicones, polymer oils, and the like, provide particularly good properties at the more elevated temperatures, i.e., temperatures ranging well above 500° F., and higher.

In another of its preferred aspects, the carrier is constituted of a conventional drilling mud, or a drilling mud component, e.g., a fluid paste or solid additive, to which the donor metal and decomposable plating-metal bearing compound, or salt, is added, or admixed, and either the donor metal or disposable plating-metal bearing compound, or both, is encapsulated. This composition, when brought into contact with a metallic drill bit at bottom hole temperature and pressure, causes breakdown of the encapsulating material, or materials, and release of the donor metal and decomposable plating-metal bearing compound, or salt, reaction and electrodeposition of the plating-metal of the decomposable plating-metal bearing compound, or salt, upon the drill bit to increase the depth of the wear surface and extend its useful life.

Typically, in its passage through the earth, the drill bit cuts through strata, or layers of shale, clay, gravel, limestone and other types of rock. As the well is extended vertically downwardly and in directional drilling, at an angle, drilling mud is pumped down the drill string to exit at the bit at the bottom of the hole, the mud being returned through the annulus between the bore hole and external face of the drill collar and pipe string. The drilling mud, which is continuously circulated from the surface to the bottom of the hole in this manner, is characterized as a mixture of weighting materials, clays, chemicals, water, oil, and the like. Its weight, or density, is controlled to prevent blowback of materials from the hole due to the high pressures, as well as to remove debris and keep the drill bit cool. The temperature at the bottom of the hole typically ranges 300° F., 400° F., or higher. At such conditions it is found that powdered zinc, of average particle diameter ranging from about 5 to about 150 microns, serves admirably as an electron donor material, and a powdered copper salt such as cupric sulfate of average particle diameter ranging from about 5 to about 150 microns, either or both types of particle of which is encapsulated in a thin film of polyethylene, serves admirably to electrodeposit, or plate copper onto the metallic drill bit at the conditions which exist at the bottom of the well bore.

In directional drilling, where the drill string is "slanted" to enter a formation from a direction other than true vertical, there is considerable wear and tear on many surfaces in addition to the bit itself. Drill collars, stems, packers, jars and other specialized tools in the drill string are among the elements which are subjected to considerable wear. Also, the pistons and cylinders of the "fluid ends" of mud pumps experience considerable wear. These machine elements, too, can be plated and the useful lives thereof extended pursuant to the practice of this invention.

The donor metal and plating-metal constituent of the decomposable plating-metal bearing compound differ one from another, and possess different electromotive potentials one with respect to the other. In other words, one metal is electronegative with respect to the other. Or, conversely, one metal is electropositive as regards the other. For example, in a preferred embodiment an encapsulated zinc powder, which is employed as an electron donor metal, and encapsulated copper sulfate, which is employed as a decomposable plating-metal bearing compound, are admixed with a carrier, e.g., a lubricant, drilling mud, or a component or additive thereof, to form a composition. On admixture of these materials with a drilling mud, the composition can be pumped to the bottom of a well bore, whereupon the encapsulating material will be decomposed at the elevated temperature and pressure and the reactants released and contacted one with the other in the vicinity of the drill bit. The electromotive potential of the copper, Cu, to form $Cu^{2+} + 2e^-$ is thus greater than that of zinc, Zn, to form $Zn^{2+} + 2e^-$ and therefore copper will be deposited on the metallic surfaces of the drill bit and zinc sulfate will be formed. The oxidation-reduction reaction is one wherein two electrons are transferred from a zinc atom, the electron donor metal, to a copper ion, the electrons being lost by the neutral atom of the more active zinc metal to the ion of the less active copper metal. The relative tendencies of metals to form metal salts and to lose electrons and become ions, and of their ions to gain electrons in the reverse process, can be found in an electromotive series of metals as published in various handbooks and text books of chemistry, e.g., General Chemistry by John Arrend Timm, McGraw-Hill Book Company, Inc. (1944), First Edition at Pages 431,440, herewith incorporated by reference.

In the practice of this invention, an active electron donor metal, or compound, can thus be selected from the electromotive series of metals which is capable of plating out less active metals of the series. Zinc, magnesium or aluminum, respectively, can thus be used to plate out any metal below these metals in the series, e.g., copper, chromium, nickel, silver, iridium, or rhodium, all of which form very salutary wearing surfaces when plated on a drill bit, or other type of machine element. The cost factor must, of course, be balanced with the enhanced wear properties of the plating metal, this in turn being greatly influenced by the particular application and nature of the machine elements which are to be electroplated.

The encapsulating material employed is one which is capable of forming a barrier film around the particulate electron donor metal, or compound, or the decomposable plating-metal bearing compound, or both, so that these reactants are released, permitted to come together, or contact one another in the proximity of the machine element to be plated. The release of the reactant, or reactants, is caused to occur by rupture, fragmentation, dissolution or destruction of the film at conditions preselected to conform generally with those which are prevalent at the machine element where surfaces thereof are in contact with each other, or with a working surface, or both. For example, at gear faces, bearings, journalled shafts and the like, physical force may provide rupture of the film and release of the reactants, or friction heat may effect rupture of the film and release of the reactants. When, e.g., the encapsulated reactants are compounded with drilling mud, the high temperature and pressure at the bottom of the well bore may trigger, or aid in triggering, rupture of the film and release of the reactants in the vicinity of the drill bit. A slowly water- or oil-soluble encapsulating material may be employed, or material which dissolves or is attacked and decomposed by pH conditions at the situs of the surface to be plated. Encapsulating materials are selected on the basis of the properties of films of desired thickness to rupture, decompose and release the reactants at the conditions encountered by the machine element in the performance of its normal operating function. One or both of the reactants can thus be encapsulated in natural film forming materials such as gelatin, gum-arabic, zein and soy protein, or by other materials, i.e., copolymers or polymers such as polyethylene, polyvinyl chloride, polystyrene, and the like.

In its preferred aspects, the novel compositions thus embody lubricants which possess good lubricity and metal-wetting characteristics, good high-temperature properties and possess as well an ability to electroplate a metal onto the metal working surface of a ferrous metal, or ferrous metal alloy surface of a machine element. An encapsulating material is thus selected which will insulate the electron donor metal, or compound, from contact with the decomposable plating-metal bearing compound, or salt, except at the conditions of operation of the machine element wherein two contacting or bearing surfaces are forced to slide one over another, or over a working surface, at which conditions the encapsulating material will break down and release the electron donor metal and decomposable plating-metal bearing compound for contact and reaction, one with the other, to produce deposition of the plating-metal of the decomposable plating-metal bearing compound upon said contacting or bearing surfaces of the machine element thereby filling the intermolecular interstices of the bearing metal with the plating metal, providing longer wear capabilities and tougher wear qualities in the operation of said machine element. Moreover, different plating metals can be successively or sequentially deposited on the bearing surfaces of a machine element, as may be desired. Nickel, e.g., can thus be deposited over a previously laid coating of copper, or vice versa, to provide longer wearing bearing surfaces. Silver, cadmium, platinum, palladium, iridium, rhodium or alloys of these metals can also be laid on the bearing surfaces of a machine element as, e.g., primary, secondary, or tertiary coatings. The principal benefit of such depositions is that as the iron or steel alloy of the bearing surface of the machine element tends to wear away under the imposed load, the more dense electrodeposited plating-metal builds up by successive depositions not only tending to reduce the friction between the load bearing surfaces, but also tends to fill the worn-away surfaces such that the plating metal deposits as a function of the wear. Various organometallic compounds can also be added to the composition, these to some extent breaking down to release metal for deposition.

It is apparent that various modifications and changes can be made without departing the spirit and scope of the invention. The electron donor metal and decomposable plating-metal bearing compound are thus chosen on the basis of the activity of the metals, the more active metal being one capable of donating electrons to the plating metal of the decomposable plating-metal bearing compound to produce a displacement-type reaction wherein the more active metal becomes ionized, and the less active plating-metal accepts the electrons and becomes neutral such that it is electrodeposited upon the metallic surfaces of the machine element. The relative activities of the various metals, in turn, are readily determined from published reference tables of the electromotive series of the metals.

Exemplary of electron donor metals, or compounds, useful in the practice of this invention are zinc, iron, stannous chloride, hydrogen sulfide, sodium sulfite, arsenious acid, oxalic acid, mercurous chloride, potassium ferrocyanide, sodium nitrite, potassium bromide, manganous sulfate, and the like; and, exemplary of decomposable plating-metal bearing compounds are potassium dichromate, ferric sulfate, potassium ferricyanide, and the like.

Having described the invention, what is claimed is:

1. A novel composition of matter useful for metal plating the metal surfaces of a machine element to increase its useful life which comprises a carrier material admixed with reactants comprised of an electron donor metal and a decomposable plating-metal bearing compound, the electron donor metal being more electropositive and higher in the electromotive series of the metals than the metal constituent of said decomposable plating-metal compound which is electronegative and consequently capable of being plated out by the more electropositive metal of said series on said metal surfaces of said machine element, one or both of which reactants is encapsulated within a film of material to form a barrier between said electron donor metal and said decomposable plating-metal bearing compound to prevent the release and contact of one reactant with the other but which, at conditions of operation of said machine element, the film of material will be caused to break-down and release the reactants from contact and reaction one with the other to deposit the plating-metal of said decomposable plating-metal bearing compound on the metal surfaces of said machine element to extend its wear capabilities and useful life.

2. The composition of claim 1 wherein the carrier is a lubricant.

3. The composition of claim 1 wherein the carrier is a lubricant comprised of an oil or grease.

4. The composition of claim 1 wherein the carrier is a drilling mud or drilling fluid or additive thereto.

5. The composition of claim 1 wherein the electron donor metal is zinc and the decomposable plating-metal bearing compound is copper sulfate.

6. The composition of claim 1 wherein the electron donor metal is zinc, the decomposable plating-metal compound is copper sulfate, the encapsulating material is polyethylene, and the carrier is a lubricating oil or grease.

7. The composition of claim 6 wherein the carrier is a drilling mud or drilling fluid or additive thereto.

8. In a process for the production of oil or gas wherein a well bore is cut into the earth by a metal drill bit attached to the lower end of a drill string connected from a swivel and kelly from a drilling rig, the kelly is driven by a rotary which rotates the drill string and drill bit, and mud is circulated through the drill string and drill bit to weight and to cool the drill string and drill bit and remove cuttings of earth from the well bore, the improvement comprising adding reactants comprised of an electron donor metal and a decomposable plating-metal bearing compound, one or both of which reactants is encapsulated within a film of material which, in the proximity of the drill bit at the bottom of the well bore, breaks down and releases the reactants for contact and reaction one with the other to deposit the plating-metal of said decomposable plating-metal bearing compound on the metal surfaces, including the bearings of said drill bit thereby extending its wear capabilities and useful life.

9. The process of claim 8 wherein the electron donor metal is zinc and the decomposable plating-metal bearing compound is copper sulfate.

10. The process of claim 9 wherein the zinc or copper sulfate, or both, is encapsulated in polyethylene.

* * * * *